United States Patent
Mao et al.

(10) Patent No.: US 10,284,936 B2
(45) Date of Patent: May 7, 2019

(54) RECEIVER

(71) Applicant: GOERTEK INC., WeiFang (CN)

(72) Inventors: Linjin Mao, WeiFang (CN); Gang Chen, WeiFang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 15/745,101

(22) PCT Filed: Jul. 8, 2016

(86) PCT No.: PCT/CN2016/089371
§ 371 (c)(1),
(2) Date: Jan. 15, 2018

(87) PCT Pub. No.: WO2017/045463
PCT Pub. Date: Mar. 23, 2017

(65) Prior Publication Data
US 2018/0270555 A1    Sep. 20, 2018

(30) Foreign Application Priority Data

Sep. 15, 2015 (CN) .................... 2015 2 0712594 U

(51) Int. Cl.
*H04M 1/03* (2006.01)
*H04R 1/02* (2006.01)
(Continued)

(52) U.S. Cl.
CPC .............. *H04R 1/023* (2013.01); *H04R 1/10* (2013.01); *H04R 1/2834* (2013.01); *H04R 9/02* (2013.01);
(Continued)

(58) Field of Classification Search
CPC .......... H04R 1/023; H04R 9/025; H04R 9/06; H04R 9/04; H04R 9/10; H04R 2400/11; H04M 1/03
(Continued)

(56) References Cited

U.S. PATENT DOCUMENTS

| | | | |
|---|---|---|---|
| 6,490,361 B1 * | 12/2002 | Klein | H04M 1/03 381/345 |
| 7,400,910 B2 * | 7/2008 | Matsumoto | H04M 1/03 381/345 |
| 2012/0328145 A1 | 12/2012 | Chen | |

FOREIGN PATENT DOCUMENTS

| CN | 104053102 A | 9/2014 |
|---|---|---|
| CN | 104244130 A | 12/2014 |

(Continued)

OTHER PUBLICATIONS

International Search Report for PCT/CN2016/089371 filed on Jul. 8, 2016.

*Primary Examiner* — Jesse A Elbin

(57) ABSTRACT

Disclosed is a receiver comprises an external housing, the external housing comprises a first housing, a second housing and a third housing adapted with each other from top to bottom, a vibration system is accommodated in a cavity formed by the external housing and comprises a vibration diaphragm dividing the receiver into a front sound cavity and a rear sound cavity, the third housing is injection-molded and provided with a sound outlet hole of the rear sound cavity which is in communication with outside environment. The third housing is coupled with a mesh fabric at a position corresponding to the sound outlet hole by injection-molding, and the mesh fabric isolates the rear sound cavity from the outside environment. The receiver can effectively prevent performance degradation of a product caused by impurities of the outside environment falling into (Continued)

the rear cavity, thereby providing a function of product protection.

8 Claims, 4 Drawing Sheets

(51) Int. Cl.
    *H04R 1/06*         (2006.01)
    *H04R 1/28*         (2006.01)
    *H04R 9/02*         (2006.01)
    *H04R 9/04*         (2006.01)
    *H04R 9/06*         (2006.01)
    *H04R 1/10*         (2006.01)

(52) U.S. Cl.
    CPC ............... *H04R 9/025* (2013.01); *H04M 1/03* (2013.01); *H04R 1/06* (2013.01); *H04R 9/04* (2013.01); *H04R 9/06* (2013.01); *H04R 2400/11* (2013.01)

(58) Field of Classification Search
    USPC .......................... 381/416, 426, 431, 349, 345
    See application file for complete search history.

(56) References Cited

FOREIGN PATENT DOCUMENTS

| | | | |
|---|---|---|---|
| CN | 203984670 U | 12/2014 | |
| WO | WO-2010004815 A1 * | 1/2010 | ............... H04R 1/22 |
| WO | WO 2013/005073 A1 | 1/2013 | |

* cited by examiner

RECEIVER

CROSS-REFERENCE TO RELATED APPLICATIONS

The present specification is a U.S. National Stage of International Patent Application No. PCT/CN2016/089371 filed Jul. 8, 2016, which claims priority to and the benefit of Chinese Patent Application No. 201520712594.9 filed in the Chinese Intellectual Property Office on Sep. 15, 2015, the entire contents of which are incorporated herein by reference.

TECHNICAL FIELD

The present application relates to an electro-acoustic technical field, and more particularly, relates to a receiver.

BACKGROUND ART

A receiver is an apparatus that can realize electro-acoustic energy conversion, which is widely used in electronic terminal devices such as mobile phones, telephones and so on. The conventional receiver construction generally comprises a magnetic circuit system, a vibration system, and an external housing which accommodates the magnetic circuit system and the vibration system. The external housing generally comprises an upper housing, a middle housing and a lower housing adapted with each other. The vibration diaphragm of the vibration system divides the receiver into a front acoustic cavity and a rear acoustic cavity, wherein the front acoustic cavity is generally a space defined by the diaphragm, the middle housing and the upper housing, and the rear acoustic cavity is generally a space defined by the diaphragm, the middle housing and the lower housing, furthermore, the rear acoustic cavity is generally provided with a sound outlet hole communicating the cavity with outside environment.

In the configuration of the existing receiver, the rear sound hole arranged in the rear sound cavity is designed to be open to outside, and this configuration enables the vibration system to directly communicate with the outside environment, resulting in impurities such as small particles, fibers and dust in the outside environment easily falling into the rear sound cavity in production process, so that when a product of the receiver operates, the voice coil and the vibration diaphragm easily collide with impurities entering interior of the receiver, resulting in product performance degradation. In view of this, it is necessary to improve current design of the rear sound hole in order to avoid a technical problem that the above-described impurities easily fall into the rear sound cavity.

SUMMARY

The technical problem to be solved by the present application is to provide a receiver in which a mesh fabric is injection-molded at a position of the sound outlet hole of the rear sound cavity to isolate the rear cavity from the outside environment.

In order to achieve the above purpose, the present application adopts the following technical solutions, i.e., a receiver comprises an external housing, the external housing comprises a first housing, a second housing and a third housing adapted with each other from top to bottom, a vibration system is accommodated in a cavity formed by the external housing and comprises a vibration diaphragm dividing the receiver into a front sound cavity and a rear sound cavity, wherein the third housing is injection-molded and provided with a sound outlet hole of the rear sound cavity which is in communication with outside environment. The third housing is coupled with a mesh fabric at a position corresponding to the sound outlet hole by injection-molding, and the mesh fabric isolates the rear sound cavity from the outside environment.

As an improvement, the sound outlet hole is provided at a corner of the third housing; the mesh fabric is coupled by injection-molding at a position corresponding to the corner of the third housing and covers the sound outlet hole.

As an improvement, the mesh fabric has a sector, a circular or a square structure.

As an improvement, a space defined by the vibration diaphragm, the second housing and the first housing forms the front sound cavity; a space defined by the vibration diaphragm, the second housing and the third housing forms the rear sound cavity.

As an improvement, the receiver further comprises a magnetic circuit system which comprising a yoke, a magnet and a washer fixed within the yoke.

As an improvement, the yoke and the third housing of the receiver are separate configurations, and a gap between the yoke and the third housing of the receiver is coated with colloid for sealing.

As an improvement, the yoke is integrally injection-molded with the third housing of the receiver to form a housing assembly, and the third housing of the receiver is a plastic component positioned at a corner of the housing assembly.

As an improvement, the plastic component is provided with a sound outlet hole of the rear sound cavity of the receiver.

As an improvement, the vibration system further comprises a voice coil bonded and fixed with the vibration diaphragm; a reinforcing portion is coupled to a center of the vibration diaphragm.

In contrast to the prior art, in the receiver of the present application, the third housing is coupled with a mesh fabric at a position corresponding to the sound outlet hole of the rear sound cavity by injection-molding, and the mesh fabric isolates the rear sound cavity of the product from the outside environment and can prevent performance degradation of the product caused by impurities such as dust, fibers and small particles in outside environment falling into the rear cavity, thereby can provide a certain of protection function.

Figure 1:
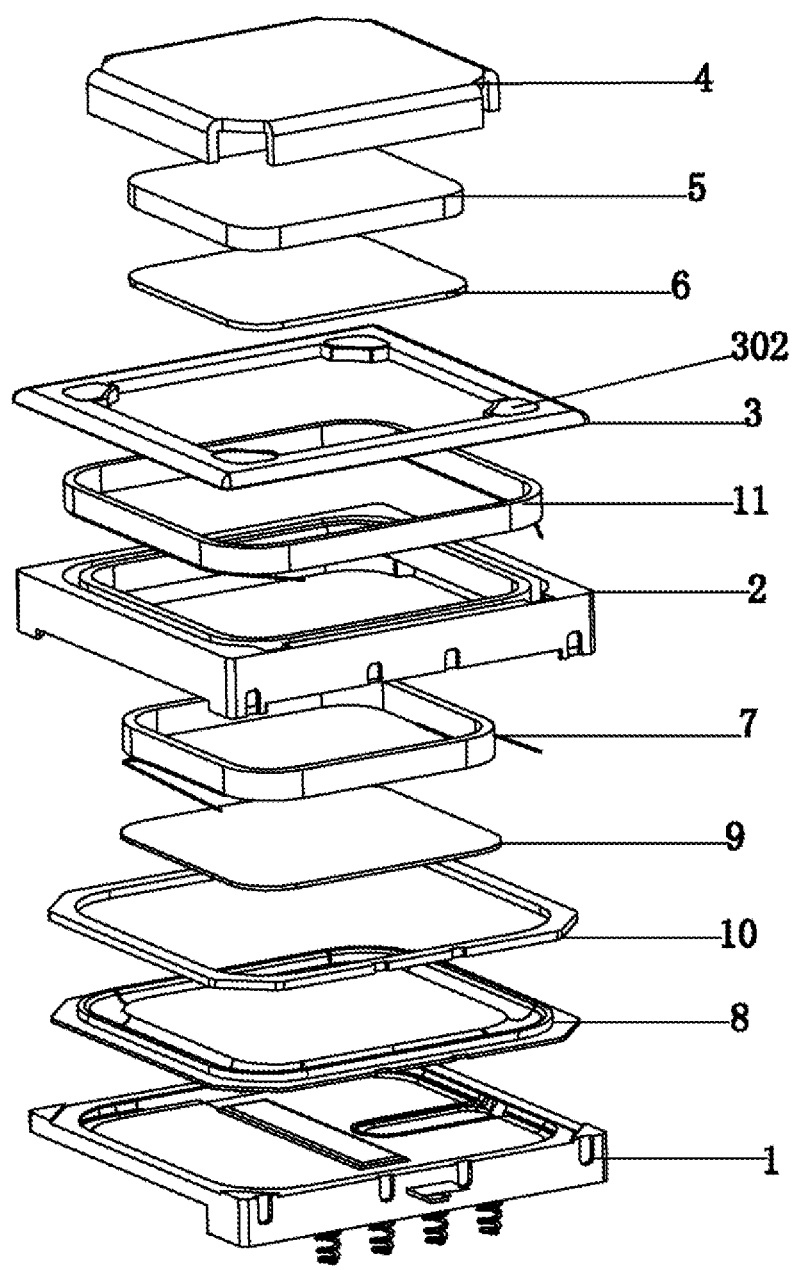
FIG. 1 is an exploded view of the construction of a receiver according to a first embodiment of the present application.

Wherein, the reference numerals comprise a first housing 1, a second housing 2, a third housing 3, a housing assembly 3', a sound outlet hole 301, a mesh fabric 302, a yoke 31', a plastic component 32', a yoke 4, a magnet 5, a magnet 5', a washer 6, a washer 6', a voice coil 7, a vibration diaphragm 8, a vibration diaphragm 8', a reinforcing portion 9, a reinforcing portion 9', 10 a metal ring, 11 a hearing aid voice coil, 12 a colloid.

DETAILED DESCRIPTION OF EMBODIMENTS

In the following description, the contents of the present application will be described in detail in combination with the accompanying drawings below.

A First embodiment

Figure 2:
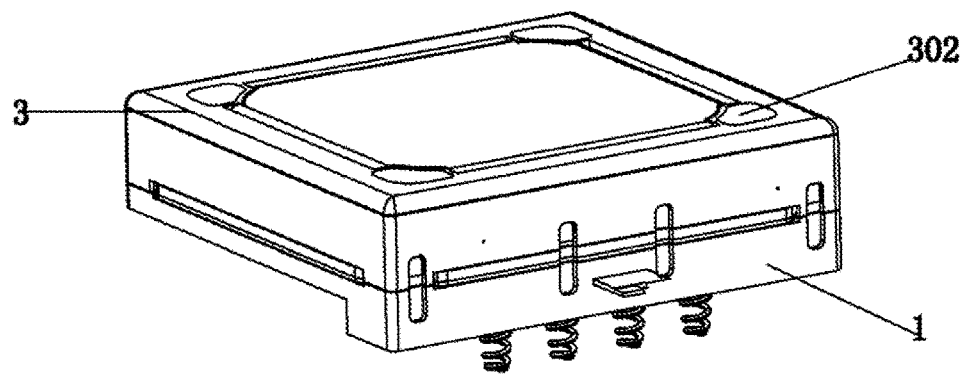
FIG. 2 is an exterior schematic view of the reverse side for the construction of the receiver according to the first embodiment of the present application.
Figure 3:
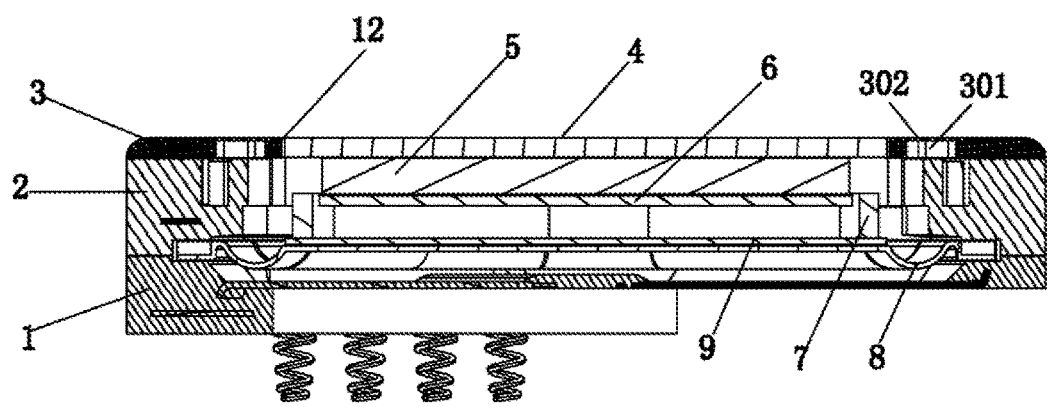
FIG. 3 is a cross-sectional view of the construction of a receiver according to the first embodiment of the present application.

Referring to FIG. 1, FIG. 2 and FIG. 3 together, a receiver of the present embodiment comprises an external housing, which in particular comprises a first housing 1, a second housing 2 and a third housing 3 adapted with each other from top to bottom to form a cavity for accommodating a magnetic circuit system and a vibration system. Furthermore, the magnetic circuit system comprises a yoke 4, a magnet 5 bonded and fixed to a surface of the yoke 4, and a washer 6 covering a surface of the magnet 5. The third housing 3 is a rectangular frame structure and is formed by injection-molded, and the yoke 4 is accommodated in a accommodating space of the third housing 3, and the gap between the yoke 4 and the third housing 3 is filled with a colloid 12 for better sealing. The vibration system comprises a vibration diaphragm 8 and a voice coil 7 bonded and fixed with the vibration diaphragm 8. A metal ring 10 is used to support the vibration diaphragm 8, and the metal ring 10 is fixed with the second housing 2. In addition, in order to enhance the acoustic performance of the receiver at high frequency, a middle portion of the diaphragm 8 is also coupled with a reinforcing portion 9, in implementation, the reinforcing portion 9 is generally a structure of a rigid composite layer. In addition, the receiver of the present embodiment further comprises a hearing aid coil 11. When the receiver is assembled with a terminal electronic device, the hearing aid coil 11 can cooperate with a hearing aid to have an effect of amplifying a sound signal, thus it facilitates those hearing impaired persons.

In this embodiment, the vibration diaphragm 8 is fixed on the second housing 2, and divides the receiver into a front sound cavity and a rear sound cavity. In particular, it can be understood that a space defined by the diaphragm 8, the second housing 2 and the first housing 1 forms the front sound cavity, and a space defined by the diaphragm 8, the second housing 2 and the third housing 3 forms the rear sound cavity, and the third housing 3 is provided with sound outlet hole(s) 301 communicating with outside environment, as the sound outlet hole(s) of the rear sound cavity. The third housing 3 is coupled with mesh fabric(s) 302 at positions corresponding to the sound outlet hole(s) 301 by injection-molding, and the mesh fabric(s) 302 isolate the rear sound cavity from outside environment.

By means of the above-described technical solution, a mesh fabric is coupled on the sound outlet hole of the rear sound cavity to prevent impurities such as dust, fiber and fine particles in the outside environment from falling into the rear sound cavity, thereby improving the performance degradation of the product caused by the impurities, and further ensuring the acoustic performance of the product.

Preferably, the sound outlet hole(s) 301 are provided at corners of the third housing 3, and the mesh fabric(s) 302 are coupled by injection-molding in corresponding to the corners of the third housing 3 and cover the sound outlet holes 301, furthermore, the mesh fabric(s) 302 can have a sector, a circular or a square structure and the like. In practice, in implementation, as long as the mesh fabric can cover the sound hole 301, the mesh fabric(s) can be any regular or irregular shape, and the specific shape thereof are not limited thereto.

A Second Embodiment

Figure 4:
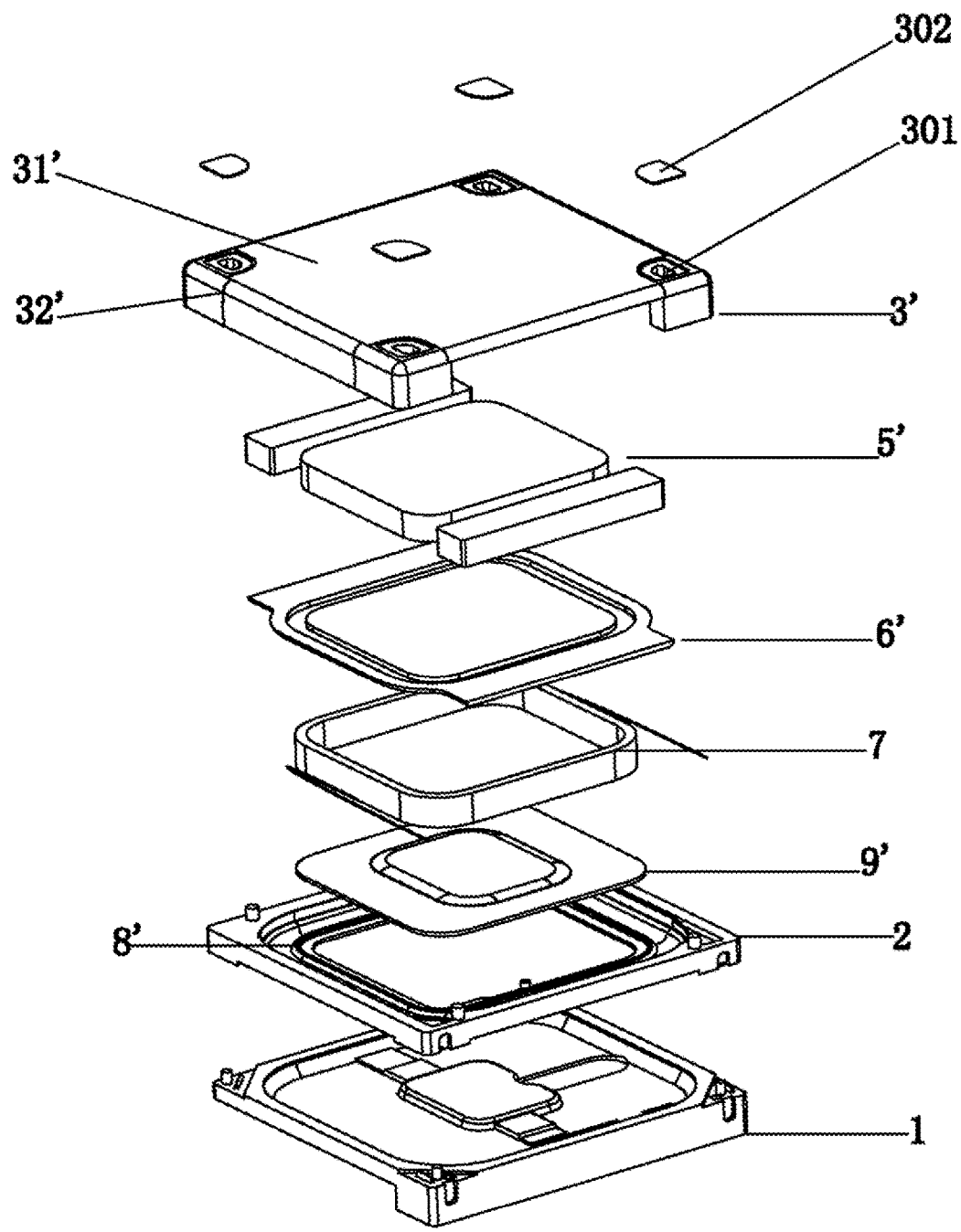
FIG. 4 is an exploded view of the construction of a receiver according to a second embodiment of the present application.
Figure 5:
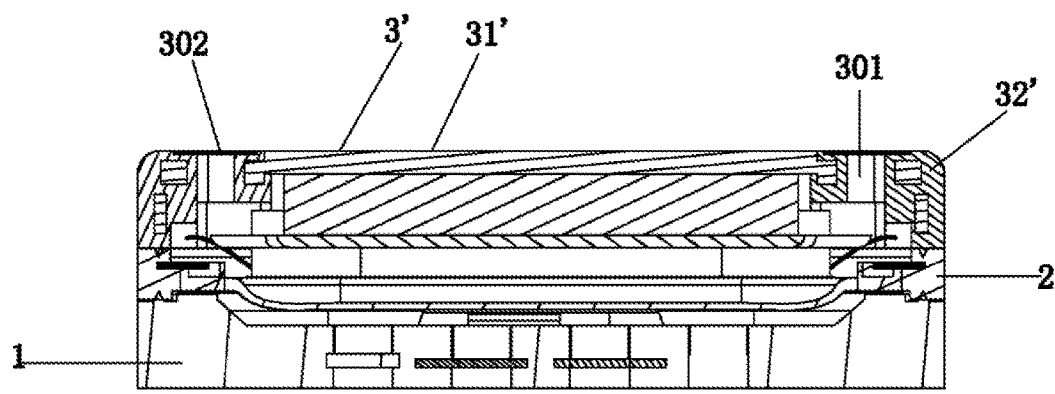
FIG. 5 is a cross-sectional view of the construction of a receiver according to the second embodiment of the present application.

Referring to FIG. 4 and FIG. 5 together, the main difference between the present embodiment and the first embodiment is that, in the first embodiment, the structure of the yoke as the magnetic circuit system and the third housing as the external housing are separate configurations, in this embodiment, the two configurations are integrally injection-molded to form a housing assembly 3'. That is to say, at this time, the housing assembly 3' specifically comprises a yoke 31' and a plastic component 32' positioned at a corner, and the third housing is the plastic component 32' described herein.

In the present embodiment, a vibration diaphragm 8' divides the receiver into a front sound cavity and a rear sound cavity, and sound outlet hole(s) 301 of the rear sound cavity are arranged on the plastic component 32' positioned at corners of the housing assembly 3', and the mesh fabric(s) 302 are integrally coupled by injection-molding at positions corresponding to the sound outlet hole(s) 301 so as to isolate the rear sound cavity from the outside environment. The specific shapes of the mesh fabric(s) 302 are the same as that of the first embodiment, and are not specifically limited thereto as long as the mesh fabric(s) can cover the sound hole(s) 301.

In this embodiment, a magnet 5' in particular comprises a center magnet and two side magnets disposed opposed to each other along a pair of opposite sides of the center magnet. Correspondingly, a washer 6' comprises a center washer covering a surface of the center magnet and side washers covering the side magnets. Herein, the vibration diaphragm 8' of the vibration system is designed as a silicon membrane, which can improve the temperature resistance performance of the vibration diaphragm and increase the vibration amplitude of the vibration diaphragm. The method of fixing the vibration diaphragm is to combine with the second housing 2 by injection-molding. In addition, a reinforcing portion 9' used for enhancing the high-frequency performance of the product has a concave structure, and can reduce the thickness of the product while optimizing the acoustic performance of the product.

It should be noted that the technical solution is intended to inject molding the mesh fabric in correspondence to the position of the sound outlet hole of the rear sound cavity so as to isolate the rear sound cavity from the outside environment, and the implementation thereof has no relation to the specific design of each component of the magnetic circuit system and the vibration system, that is to say, the implementation of the present technical solution is not limited to the above-described magnetic circuit structure, the structure of the vibration diaphragm or the reinforcing portion and the like, and as long as a mesh fabric is injection-molded at the position of the sound outlet hole of the rear sound cavity of the receiver product, it should be regarded as the protection scope of the present application.

The above embodiments are merely embodiment examples of the present application, and are not intended to limit the protection scope of the present application. All the equivalent modifications or changes which can be performed by the skilled in the art according to the disclosure contents of the present application should be contained in the protection scope described in claims.

The invention claimed is:

1. A receiver comprising an external housing, wherein the external housing comprises a first housing, a second housing and a third housing adapted with each other from top to bottom, a vibration system is accommodated in a cavity formed by the external housing and comprises a vibration diaphragm dividing the receiver into a front sound cavity and a rear sound cavity, wherein the third housing is injection-molded and provided with a sound outlet hole of the rear sound cavity which is in communication with outside environment, the third housing is coupled with a mesh fabric at a position corresponding to the sound outlet hole by injection-molding, and the mesh fabric isolates the rear sound cavity from the outside environment, wherein the sound outlet hole is provided at a corner of the third housing, and the mesh fabric is coupled by injection-molding at a position corresponding to the corner of the third housing and covers the sound outlet hole, and wherein the mesh fabric has a sector, a circular or a square structure.

2. The receiver according to claim 1, wherein a space defined by the vibration diaphragm, the second housing and the first housing forms the front sound cavity, and a space defined by the vibration diaphragm, the second housing and the third housing forms the rear sound cavity.

3. The receiver according to claim 1, further comprising a magnetic circuit system which comprises a yoke, a magnet and a washer fixed within the yoke.

4. The receiver according to claim 3, wherein the yoke and the third housing of the receiver are separate configurations, and a gap between the yoke and the third housing of the receiver is coated with colloid for sealing.

5. The receiver according to claim 3, wherein the yoke is integrally injection-molded with the third housing of the receiver to form a housing assembly, and the third housing of the receiver is a plastic component positioned at a corner of the housing assembly.

6. The receiver according to claim 5, wherein the plastic component is provided with a sound outlet hole of the rear sound cavity of the receiver.

7. The receiver according to claim 1, wherein the vibration system further comprises a voice coil bonded and fixed with the vibration diaphragm, and a reinforcing portion is coupled to a center of the vibration diaphragm.

8. A receiver comprising an external housing, wherein the external housing comprises a first housing, a second housing and a third housing adapted with each other from top to bottom, a vibration system is accommodated in a cavity formed by the external housing and comprises a vibration diaphragm dividing the receiver into a front sound cavity and a rear sound cavity, wherein the third housing is injection-molded and provided with a sound outlet hole of the rear sound cavity which is in communication with outside environment, the third housing is coupled with a mesh fabric at a position corresponding to the sound outlet hole by injection-molding, and the mesh fabric isolates the rear sound cavity from the outside environment, further comprising a magnetic circuit system which comprises a yoke, a magnet and a washer fixed within the yoke, wherein the yoke and the third housing of the receiver are separate configurations, and a gap between the yoke and the third housing of the receiver is coated with colloid for sealing.

* * * * *